(12) United States Patent
Kumar et al.

(10) Patent No.: US 11,218,918 B2
(45) Date of Patent: Jan. 4, 2022

(54) FAST ROAMING AND UNIFORM POLICY FOR WIRELESS CLIENTS WITH DISTRIBUTED HASHING

(71) Applicant: Cisco Technology, Inc., San Jose, CA (US)

(72) Inventors: Prashant Kumar, Cupertino, CA (US); Tirthankar Ghose, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/939,749

(22) Filed: Jul. 27, 2020

(65) Prior Publication Data

US 2020/0359273 A1 Nov. 12, 2020

Related U.S. Application Data

(63) Continuation of application No. 16/291,752, filed on Mar. 4, 2019, now Pat. No. 10,728,807.

(51) Int. Cl.
| | |
|---|---|
| *H04W 36/00* | (2009.01) |
| *H04L 9/06* | (2006.01) |
| *H04W 12/04* | (2021.01) |
| *H04W 12/06* | (2021.01) |
| *H04W 36/08* | (2009.01) |
| *H04W 36/18* | (2009.01) |

(52) U.S. Cl.
CPC ....... *H04W 36/0038* (2013.01); *H04L 9/0643* (2013.01); *H04W 12/04* (2013.01); *H04W 12/06* (2013.01); *H04W 36/08* (2013.01); *H04W 36/18* (2013.01); *H04L 2209/80* (2013.01)

(58) Field of Classification Search
CPC . H04W 36/0038; H04W 12/04; H04W 36/08; H04W 36/18; H04W 12/06; H04L 9/0643; H04L 2209/80
See application file for complete search history.

(56) References Cited

U.S. PATENT DOCUMENTS

| | | | | |
|---|---|---|---|---|
| 2007/0005972 | A1* | 1/2007 | Mizikovsky | ........ H04L 63/0869 713/171 |
| 2013/0183998 | A1* | 7/2013 | Pylappan | .......... H04W 36/0016 455/456.1 |
| 2014/0040422 | A1* | 2/2014 | Jaggi | ..................... H04W 88/08 709/217 |

* cited by examiner

*Primary Examiner* — Mazda Sabouri
(74) *Attorney, Agent, or Firm* — Patterson + Sheridan, LLP

(57) ABSTRACT

Techniques for efficient roaming of clients between access points (APs) of a wireless data communications network are described. A first AP receives a request for a first client device to join the network. The request specifies at least a unique identifier for the first client device. An identifier for a second AP is identified by processing the unique identifier using a predefined hash function. The second AP is one of at least two APs configured to each redundantly store network state information relating to the first client device. A network address of the second AP is determined. A first request to is transmitted to the network address, for network state information including a pairwise master key (PMK) and profile information. The PMK and the profile information are received. The first client device is authenticated and a connection is established between the first client device and the network.

11 Claims, 8 Drawing Sheets

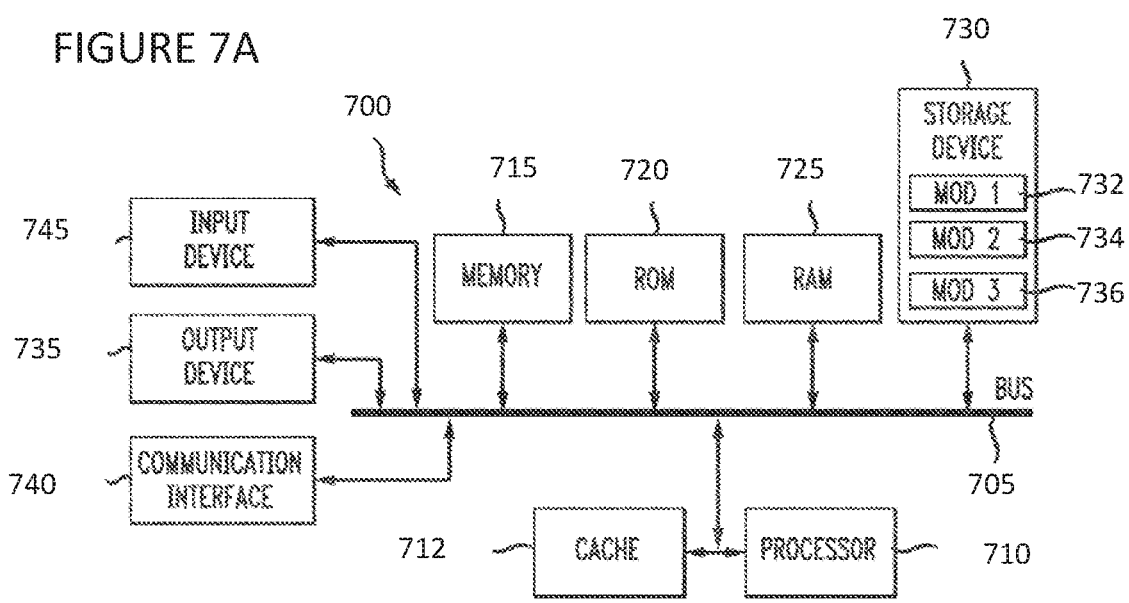

FAST ROAMING AND UNIFORM POLICY FOR WIRELESS CLIENTS WITH DISTRIBUTED HASHING

CROSS-REFERENCE TO RELATED APPLICATIONS

This application is a continuation of co-pending U.S. patent application Ser. No. 16/291,752, filed Mar. 4, 2019. The aforementioned related patent application is herein incorporated by reference in its entirety.

TECHNICAL FIELD

Embodiments presented in this disclosure generally relate to wireless data communications, and more specifically, embodiments disclosed herein provide techniques for enabling fast roaming and uniform policy management for wireless clients using distributed hashing.

BACKGROUND

Modern wireless networks for larger physical regions are often made up of numerous different access points. For example, when implementing a wireless network for an entire building, a single access point may not be able to provide adequate coverage to all areas within the building. As a result, a wireless network can be implemented that contains multiple access points distributed throughout the building, in order to provide adequate coverage and signal strength for the entire physical space.

One potential way to create such a network would be to use numerous isolated access points throughout the roaming domain (e.g., the building). However, when isolated access points are used, session data would not be maintained when roaming from one access point to another. Thus, a user may need to perform authentication operations each time a roam occurs and may lose other session data as well as a result of the roam. As such, a technical problem exists in managing roaming across access points in a wireless network. This problem is exacerbated in large-scale networks, where poor scalability can render conventional solutions to maintain session data when roaming within a network infeasible.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 7A-7B are block diagrams illustrating example computer systems, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
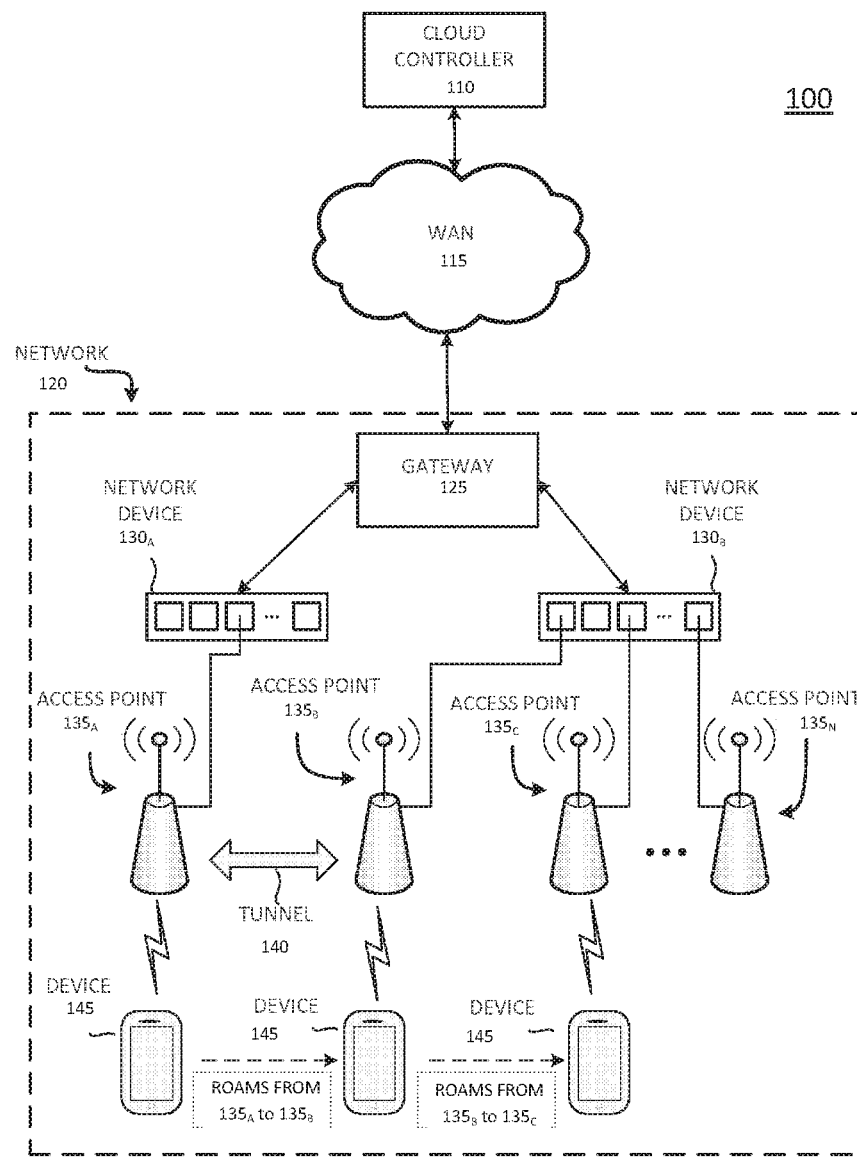
FIG. 1 is a simplified block diagram illustrating example details of a communication configured with a network automation and orchestration component, according to one embodiment described herein.

One embodiment provides a method that includes receiving, from a first client device, at a first wireless access point of a plurality of wireless access points for a network, a request for the first client device to join the network. The request specifies at least a unique identifier for the first client device. The method further includes determining an identifier for a second wireless access point of the plurality of wireless access points, by processing the unique identifier for the first client device using a predefined hash function. The second wireless access point is one of at least two wireless access points configured to each redundantly store network state information relating to the first client device. The method further includes determining a network address of the second wireless access point using the determined identifier for the second wireless access point. The method further includes transmitting a first request to the determined network address of the second wireless access point, for network state information corresponding to the first client device, the network state information including a pairwise master key (PMK) associated with the first client device and profile information associated with the first client device. The method further includes receiving the PMK associated with the first client device and the profile information associated with the first client device. The method further includes authenticating the first client device and establishing a connection between the first client device and the network, using the PMK and the profile information.

Another embodiment provides a wireless access point that includes one or more computer processors and non-transitory logic that when executed by operation of the one or more computer processors performs an operation. The operation includes receiving, from a first client device, at a first wireless access point of a plurality of wireless access points for a network, a request for the first client device to join the network. The request specifies at least a unique identifier for the first client device. The operation further includes determining an identifier for a second wireless access point of the plurality of wireless access points, by processing the unique identifier for the first client device using a predefined hash function. The second wireless access point is one of at least two wireless access points configured to each redundantly store network state information relating to the first client device. The operation further includes determining a network address of the second wireless access point using the determined identifier for the second wireless access point. The operation further includes transmitting a first request to the determined network address of the second wireless access point, for network state information corresponding to the first client device, the network state information including a pairwise master key (PMK) associated with the first client device and profile information associated with the first client device. The operation further includes receiving the PMK associated with the first client device and the profile information associated with the first client device. The operation further includes authenticating the first client device and establishing a connection between the first client device and the network, using the PMK and the profile information.

Another embodiment provides a system that includes a plurality of wireless access points configured to form a network. A first wireless access point of the plurality of wireless access points is configured to perform an operation The operation includes receiving, from a first client device, a request for the first client device to join the network. The request specifies at least a unique identifier for the first client device. The operation further includes determining an identifier for a second wireless access point of the plurality of wireless access points, by processing the unique identifier for the first client device using a predefined hash function. The second wireless access point is one of at least two wireless access points configured to each redundantly store network state information relating to the first client device. The operation further includes determining a network address of the second wireless access point using the determined identifier for the second wireless access point. The operation further includes transmitting a first request to the determined network address of the second wireless access point, for network state information corresponding to the first client device, the network state information including a pairwise master key (PMK) associated with the first client device and profile information associated with the first client device. The operation further includes receiving the PMK associated with the first client device and the profile information associated with the first client device. The operation further includes authenticating the first client device and establishing a connection between the first client device and the network, using the PMK and the profile information.

Example Embodiments

The subject technology provides embodiments for wireless roaming in a network. One embodiment provides a method that includes receiving, from a first client device, at a first wireless access point of a plurality of wireless access points for a network, a request for the first client device to join the network. The request can specify at least a unique identifier for the first client device, such as a Media Access Control (MAC) address for the client device. The method includes determining an identifier for a second wireless access point of the plurality of wireless access points, by processing the unique identifier for the first client device using a predefined hash function. For example, a consistent hash could be used to determine the identifier.

Additionally, in such an embodiment, the method can include determining a network address of the second wireless access point. In one embodiment, this can be done by performing a lookup operation in a route table stored on the first wireless access point using the determined identifier for the second wireless access point. Alternatively, this network address can be provided by a management entity. As another alternative, the network address can be identified using local discovery techniques. The method can include transmitting a request to the determined network address of the second wireless access point to query for network state information corresponding to the first client device. The method further includes upon receiving a pairwise master key (PMK) associated with the first client device, authenticating the first client device to join the network.

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

FIG. 1 illustrates an example system 100 used to implement wireless roaming. The system 100 can include a network 120 connected to a Wide Area Network (WAN) 115 such as the Internet. In some embodiments, network 120 may be a private network that can include one or more local area networks (LANs), VLANs, etc. As one of ordinary skill in the art will readily recognize, network 120 can also or otherwise be connected to any other public or private network in other embodiments. However, WAN 115 is used as a non-limiting example for the sake of clarity.

The network 120 can include one or more devices such as device 145. Device 145 can include, for example, a client or host device such as a personal computer or terminal, desktop, laptop, tablet, mobile phone, wireless media player, gaming system, etc. For simplicity, network 120 includes a single device 145, but one skilled in the art will recognize that network 120 can include any number of devices.

In addition, network 120 can include access points (APs) $135_A$, $135_B$, $135_C$ ... $135N$ (collectively 135). APs 135 can provide wireless network access to device 145 (e.g., a client device). APs 135 can be connected to network devices $310_A$ and $310_B$ (collectively 310). The network devices 310 can include L2 and/or L3 devices, such as switches or routers, for example. Those skilled in the art will recognize that the present technology is not limited to a particular network configuration or size.

In network 120, AP $135_A$ can send and receive network traffic via network device $310_A$. Similarly, AP $135_B$ and AP $135_C$ can send and receive network traffic via network device $310_B$. Network devices 310 can connect to Gateway 125. Gateway 125 can be a node such as a router that provides access to network 120. For example, Gateway 125 can connect to one or more Internet Service Providers (ISPs) to allow network 120 to access WAN 115, i.e. the Internet. In addition, a cloud controller 200 can access network 120 by way of WAN 115 and be used to perform a number of network management operations for network 120, as described above with respect to FIG. 2 and as described further herein.

Device 145 can include a wireless transceiver that is capable of communicating with APs 135. When device 145 is located within the signal range of AP $135_A$, it can establish a communication session and become associated with AP $135_A$. In some embodiments, device 145 can provide particular credentials before it can become associated with AP $135_A$. For example, the Media Access Control (MAC) address of device 145 can be used to determine if device 145 is allowed access to network 120. Alternatively, Remote Authentication Dial in User Service (RADIUS) can be used to determine if device 145 is allowed access to network 120. Authentication may require the user of device 145 to enter a particular password before device 145 can access network 120. In some cases, one or more of the APs 135 can be part of a wireless network, which can include an SSID (service set identifier). Thus, device 145 can join the wireless network using the SSID and/or any other credentials.

Upon successful association, device 145 can gain access to network 120, and can obtain network or data services via access point $135_A$. Network and data services can include internet web browsing, gaming, voice over internet protocol (VOIP), instant messaging, video streaming, video conferencing, computing resources, file sharing, etc. The network and data services can be provided to device 145 according to an address, such as an internet protocol (IP) address, associated with device 145. The IP address of device 145 can be assigned as a static IP address or it can be assigned dynamically according to the Dynamic Host Configuration Protocol (DHCP).

As illustrated in FIG. 1, device 145 has the ability to roam within network 120 and connect to different APs 135. For example, device 145 can roam from AP $135_A$ to AP $135_B$ after it has become associated with AP $135_A$. If AP $135_B$ is also on VLAN 1, device 145 can be reached via the same IP address, as device 145 remains logically connected to the home broadcast domain.

Alternatively, APs 135 can be configured to connect to different VLANs. For example, AP $135_B$ can be configured to connect to VLAN 2, which can correspond to a different VLAN than VLAN 1 for AP $135_A$. In this case, when device 145 roams from AP $135_A$ to AP $135_B$, AP $135_B$ can tunnel traffic (e.g., using tunnel 140) associated with device 145 to AP $135_A$. This way, device 145 can maintain its connection to its home broadcast domain (VLAN 1) and avoid interruption in services. By maintaining its connection to its home broadcast domain, device 145 can also maintain its IP address. Thus, data routed to device 145 based on its IP address can be delivered to device 145 by way of the tunnel 316 that links device 145 back to its original home broadcast domain.

Providing an efficient and highly scalable mechanism through which the device 145 can roam between the access points 135 presents a difficult technical challenge, particularly in large scale networks that can contain thousands of users and hundreds, if not thousands, of different access points. In such a scenario, it can be infeasible for each access point to store network state information on each different client device that is connected to one of the numerous access points within the network. Moreover, such a solution would generate a significant amount of network traffic in updates to network state information for clients, as an update would need to be broadcast to every other access point in the network when a client roams, when a client joins the network, and so on.

As such, embodiments described herein provide techniques for facilitating efficient roaming of client devices across access points 135 of a wireless data communications network. According to one embodiment, a client roaming management component on an access point can receive a connection request from the client device 145. For example, in the depicted embodiment, assume that the client roaming management component on the client access point 135$_B$ receives a connection request, when the client device 145 roams from access point 135$_A$ to access point 135$_B$. Such a connection request can specify, amongst other parameters and data values, a unique identifier for the client device 145. For example, the connection request could specify a Media Access Control (MAC) address for the client device 145.

Figure 4:
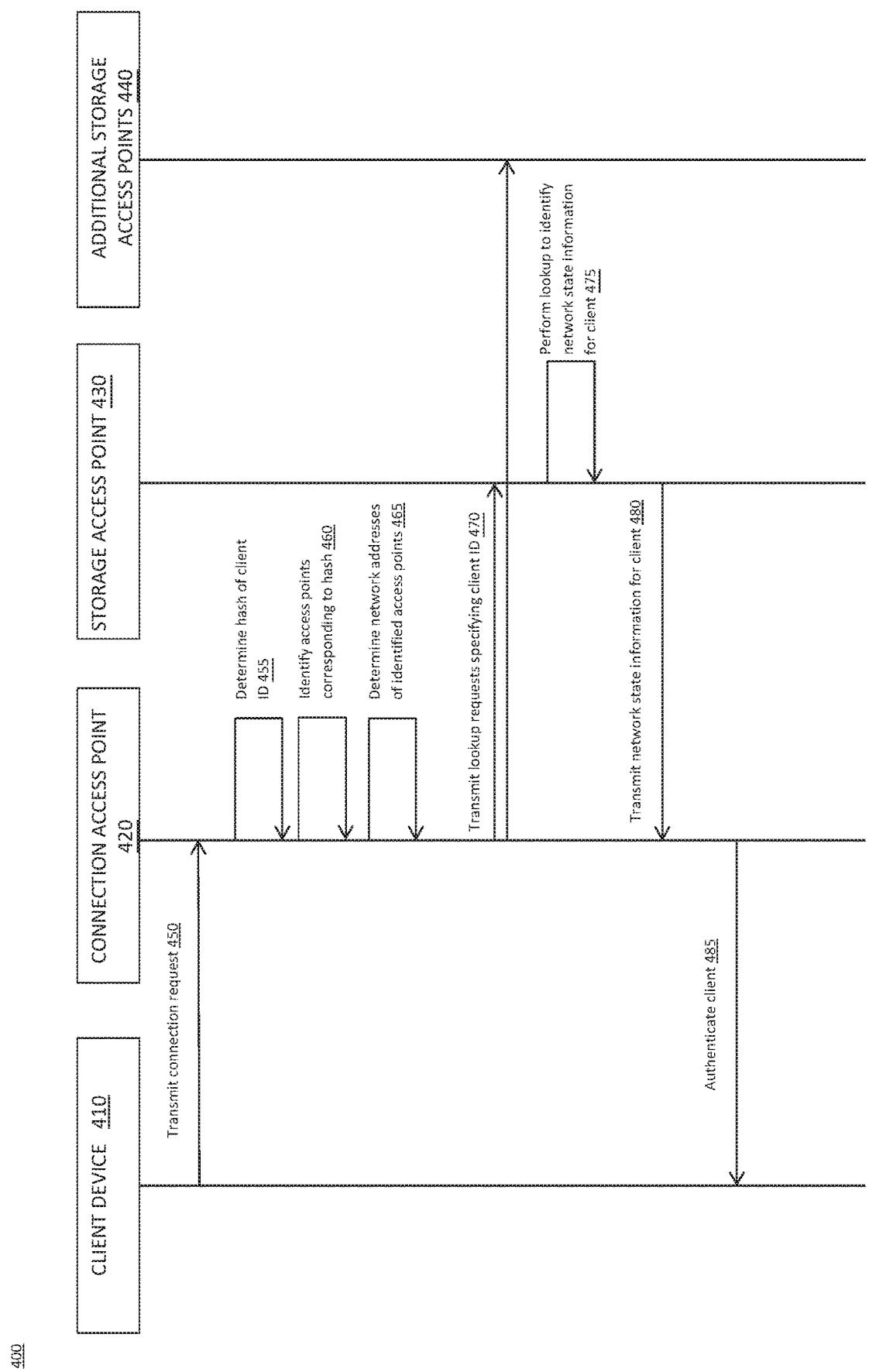
FIG. 4 is a flow diagram illustrating a method for efficiently authenticating a client roaming across access points of a network, according to one embodiment described herein.

The client roaming management component on the access point 135$_B$ could determine an identifier for another wireless access point 135 of the plurality of wireless access points 135$_{A-N}$ (e.g. a storage access point 430 as illustrated in FIG. 4) that may contain network state data for the client device 145, by processing the unique identifier for the client device 145 using a predefined hash function. For example, the client roaming management component could utilize a consistent hash and could determine a hash value by processing the client MAC address using a predefined hash function. In one embodiment, the client roaming management component could utilize consistent hashing to determine the identifier of the wireless access point that corresponds to the client's MAC address. Generally, consistent hashing is a distributed hashing system that operates independently of the total number of wireless access points in the network, thereby allowing the number of wireless access points to scale without having a substantial impact on the hashing system (i.e., by minimizing the number of keys that need to be relocated as a result of the scaling). Such a hashing system can be advantageous, as the number of wireless access points that are activated within the network can fluctuate over time, e.g., when access points are rebooted, when access points are replaced, when access points are added, and so on. Generally, consistent hashing operates by assigning the wireless access points to a respective position on abstract circle.

The client roaming management component could then determine a network address of the storage wireless access point 135. In one embodiment, this can be done by performing a lookup operation in a route table stored on the wireless access point 135$_B$ using the determined identifier for the second wireless access point. Alternatively, this network address can be provided by a management entity. As another alternative, the network address can be identified using local discovery techniques. The client roaming management component could then transmit a request to the determined network address of the storage wireless access point to query for network state information corresponding to the client device 145.

That is, embodiments may selectively store a given client device's network state information at one or more of the access points 135$_{A-N}$ within the network through the use of the hash function. Doing so conserves data storage resources on the wireless access points (e.g., relative to conventional solutions, where network state data for all clients across all of the access points) and facilitates the efficient lookup of network state data for a client. In the depicted embodiment, if the storage access point determines that it contains network state data for the client device 145, the storage access point could return a pairwise master key (PMK) and/or any other network states data associated with the client device 145 to the client roaming management component on the access point 135$_B$. The client roaming management component can then use the PMK and other network state data to authenticate the first client device to join the network. Doing so enables the fast and efficient roaming of the client device 145 across the access points 135$_{A-N}$.

Figure 2:
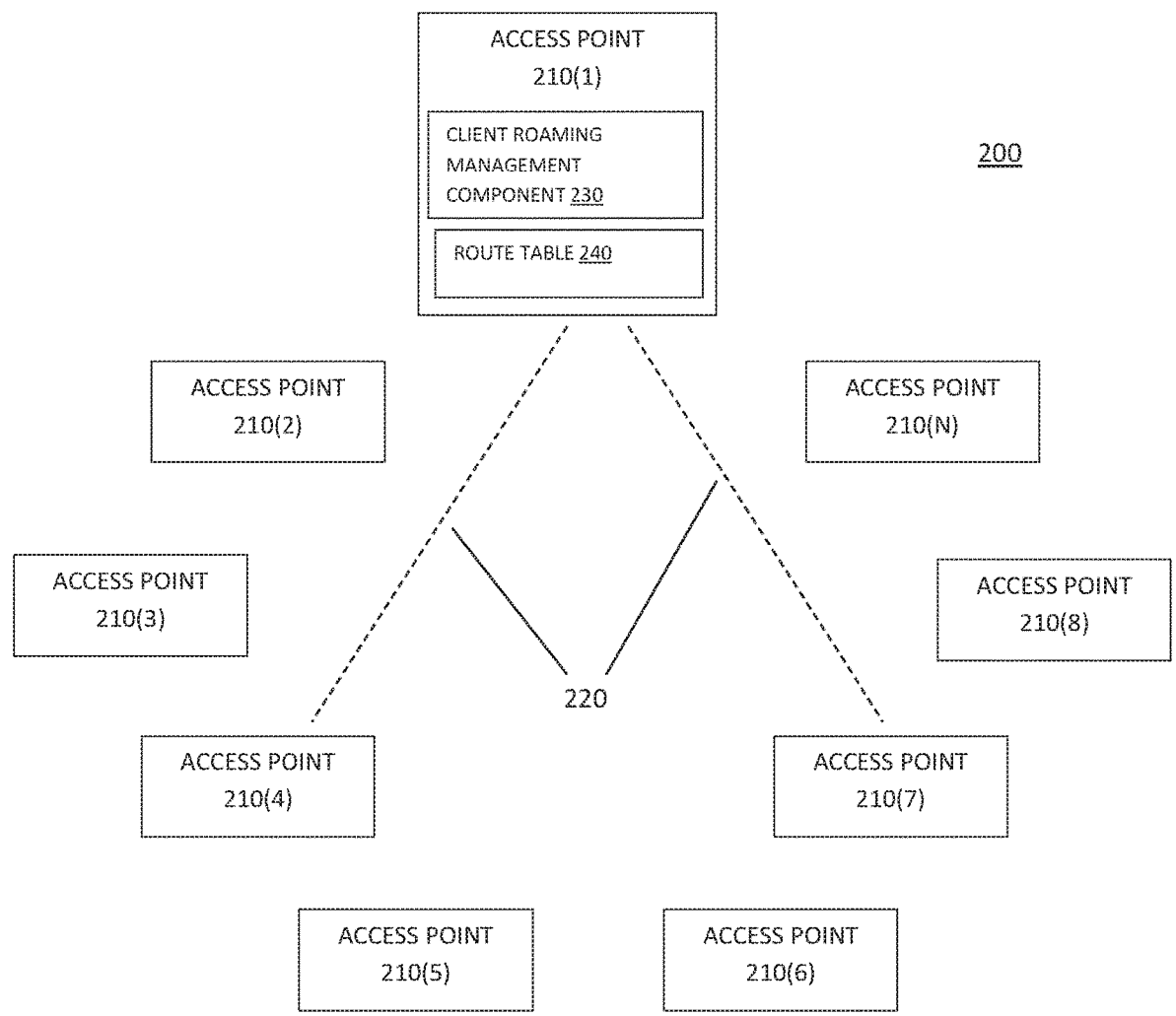
FIG. 2 is a block diagram illustrating the redundant storage of network state data across access points within a network, according to one embodiment described herein.

FIG. 2 is a block diagram illustrating the redundant storage of network state data across access points within a network, according to one embodiment described herein. As shown, the system 200 illustrates a plurality of access points 210(1)-(N). In the depicted embodiment, the access point 210(1) contains a client roaming management component 230 and a route table 240. Of note, while a detailed view of the access point 210(1) is shown in the diagram 200, more generally each of the access points 210(2)-(N) can be configured with respective instances of the client roaming management component 230 and route table 240.

Generally, the client roaming management component 230 on the access point 210(1) (together with the client roaming management components on the access points 210(2)-(N)) is configured to manage network state data for client devices across the access points 210(1)-(N). For example, when a new client successfully authenticates itself and connects to the access point 210(1), the client roaming management component 230 could determine one or more of the access points 210(1)-(N) to store network state data for the particular client. For example, the client roaming management component 230 could use a distributed hashing function (e.g., consistent hash) to determine one of the access points 210(1)-(N) to store the network state data for the client. More specifically, the client roaming management component 230 could generate a hash value by processing the client device's MAC address using a hash function. The client roaming management component 230 could then use the route table 240 to determine a network address corresponding to the hash value. For example, the client roaming management component 230 could use the route table 240 to lookup an Internet Protocol (IP) address of the wireless access point assigned to store network state data for the client device in question. Alternatively, the client roaming management component 230 could be provided the IP address by a management entity. As another alternative, the client roaming management component 230 can identify the IP address using local discovery techniques. The client roaming management component 230 could then transmit a request to the IP address, specifying the client device's identifier (e.g., MAC address) and requesting network state data for the client device if such state data is available.

In a particular embodiment, the client roaming management component 230 can be configured to store network state data for each client device authenticated on the network in multiple storage locations. For example, assume that the client roaming management component 230 generates a hash value by processing a particular client's MAC address and the hash value corresponds to the access point 210(1), indicating that the access point 210(1) should be used to store the particular client's network state information. The client roaming management component 230 could further determine additional access points to redundantly store the network state data for the particular client. Such redundant storage can be beneficial, for example, when one of the access points or a connection within the network is experiencing an issue, thereby delaying or preventing communications with one or more of the access points.

In one embodiment, the client roaming management component 230 is configured to use consistent hashing to determine which network device should be used to store a particular client's network state information. Generally, consistent hashing refers to a distributed hashing algorithm, where the access points 210(1)-(N) can be assigned positions on an abstract circle. Such a circular arrangement is visualized in the diagram 200. In such an embodiment, the client roaming management component 230 can select n additional access points to redundantly store network state data that is stored on the access point 210(1). For example, the client roaming management component 230 could position the n additional access points equidistant from each other in the abstract circular arrangement of the access points 210(1)-(N). Thus, in the depicted embodiment, the client roaming management component 230 has determined to store the network state data on the access point 210(1) in two additional locations (i.e., n=2 in the depicted embodiment), and has selected the access points 210(4) and 210(7) to store the additional network data. In such an embodiment, when querying for network state data for a client device requesting to connect to an access point, the access point can query not only the network state device identified by the hashing algorithm, but can also query the redundant storage locations. Of course, one of ordinary skill in the art will recognize that any number of different redundant storage locations and schemes can be used, consistent with the present disclosure, and such an example is provided for illustrative purposes only and without limitation.

Figure 3:
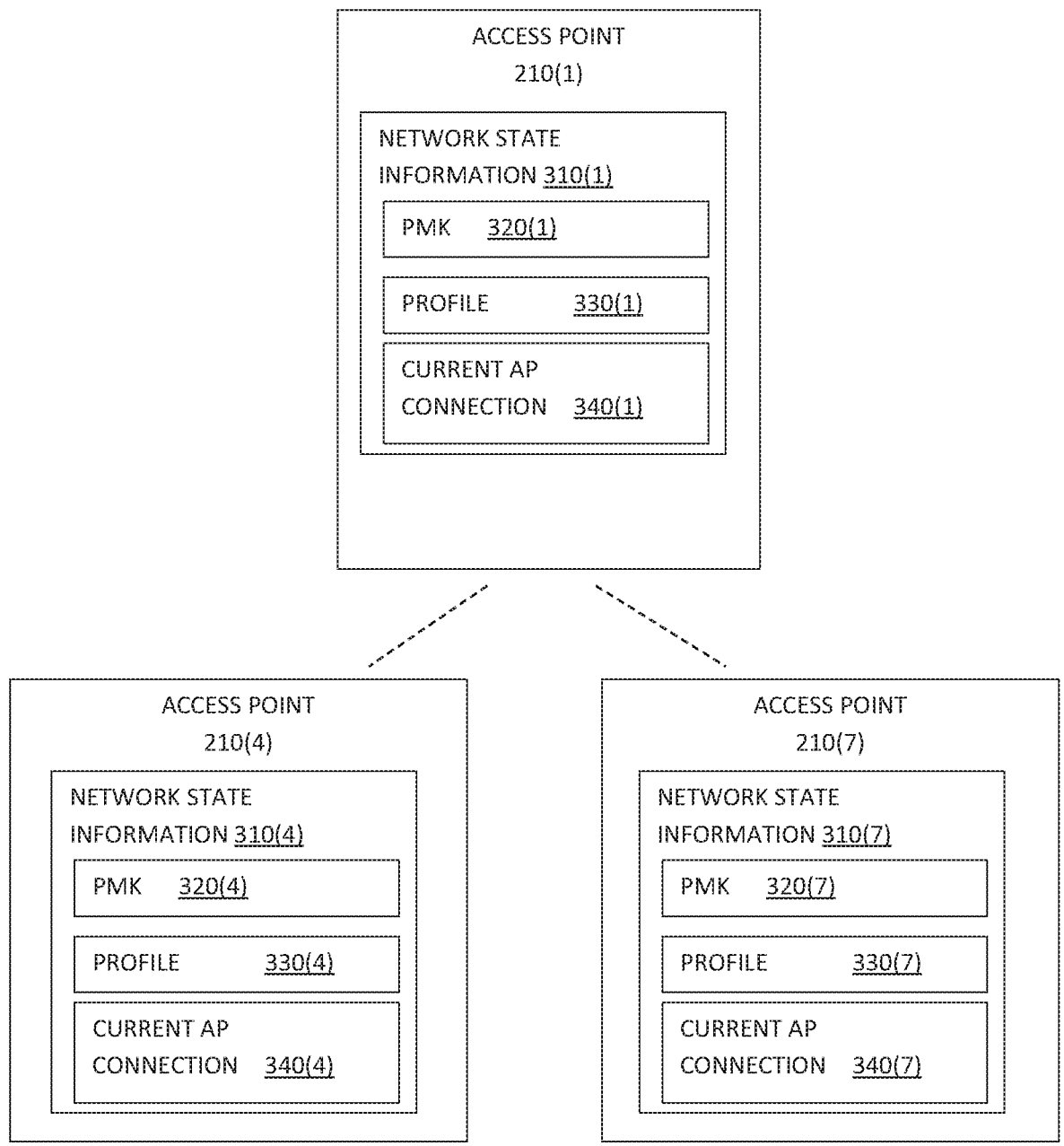
FIG. 3 is a block diagram illustrating a more detailed view of redundantly stored network state data across access points of a network, according to one embodiment described herein.

Continuing this example, FIG. 3 is a block diagram illustrating a more detailed view of redundantly stored network state data across access points of a network, according to one embodiment described herein. As shown, the system 300 contains access points 210(1), 210(4) and 210(7). As discussed above, the access points 210(1), 210(4) and 210(7) store redundant copies of network state information for clients whose identifier (e.g., MAC addresses) hash to one of the access points 210(1), 210(4) and 210(7). In the depicted embodiment, such network state data is represented by the network state information 310(1), 310(4), and 310(7) that is stored on the access points 210(1), 210(4) and 210(7), respectively. As shown, the network state information 310(1) contains a Pairwise Master Key (PMK) for an authenticated client device, a profile 330(1) for the client device, and a current AP connection 340(1) for the client device. Generally, the current AP connection 340(1) indicates which of the access points in the network the particular client device is currently connected to. The access points 210(4) and 210(7) contain redundant copies of the network state information 310(1), as shown by network state information 310(4) and 310(7).

When a new client device attempts to connect to one of the access points 210(1)-(N) within the network, the client roaming management component 230 on the access point can receive, from the new client device, a request for the client device to join the network. Such a request can specify a unique identifier for the client device, such as the client device's MAC address. The client roaming management component 230 could determine a hash value corresponding to the client device by hashing the client identifier using a hash function. Generally, such a hash value can represent an identifier for another one of the access points within the network. For the present example, assume that the hash value corresponds to the hash value 210(1).

The client roaming management component 230 could then access a local copy of the route table 240 using the hash value to determine a network address (e.g., an IP address) of the access point 210(1). Alternatively, the client roaming management component 230 could be provided the network address by a management entity. As another alternative, the client roaming management component 230 can identify the network address using local discovery techniques. The client roaming management component 230 could transmit a request to the access point 210(1), using the network address, to obtain network state data (if available) for the client device. The access point 210(1), upon receiving the request, could identify the network state information 310(1) corresponding to the request and could return this information to the client roaming management component 230 originating the request. The client roaming management component 230 could then use the received network state information 310(1), including the PMK 320(1) associated with the client device, to authenticate the client device to join the network.

Additionally, the client roaming management component 230 could determine one or more redundant storage locations designated to store, if available, network state information for the client device. For example, upon determining the hash value that identifies the access point 210(1), the client roaming management component 230 could determine (e.g., based on predefined configuration data) that the network is configured to store two redundant copies of network state information in access points that are equidistant from the access point identified by the hash value (e.g., access points that are equidistant from the access point 210(1) in the abstract circle generated according to the consistent hashing algorithm). In the depicted embodiment, the client roaming management component 230 could determine that the access points 210(4) and 210(7) are designated as redundant storage locations for the access point 210(1). As a result, the client roaming management component 230 could identify a network address for each of the access points 210(4) and 210(7) using the route table 240 (or any other suitable technique, including being provided the network addresses by a management entity and using local discovery), and could transmit requests to the access points 210(4) and 210(7), using the network addresses, to obtain network state data (if available) for the client device.

In an embodiment where the client roaming management component 230 transmits multiple requests to different access points (e.g., three requests to access points 210(1), 210(4) and 210(7), in the current example), the client roaming management component 230 can process the first response received from the different access points. That is, since the access points are configured to store the same data, the reply messages from the access points should also be the same, and thus the client roaming management component 230 can rely on the first response received. Doing so improves the performance of the data communications network, as the client roaming management component 230 can more quickly process client requests, particularly when the network is experiencing an issue (e.g., where the access point identified by the hash value is unavailable or slow to respond, due to a network issue).

FIG. 4 is a flow diagram illustrating a method for efficiently authenticating a client roaming across access points of a network, according to one embodiment described herein. As shown, the method 400 begins at block 450, where a client device 410 transmits a connection request to a connection access point 420. In an embodiment, the connection access point 420 is an access point to which the client device 410 is roaming. For example, the client device may have previously associated with another access point. As part of that association, the previous access point will undertake full authentication (e.g., using a radius server) and will generate a PMK associated with the client device 410. That PMK is stored in a location known to the connection access point 420 (e.g., the PMK is stored at a storage access point 430 and additional storage access points 440).

To retrieve the PMK, the client roaming management component 230 on the connection access point 420 determines a hash value based on an identifier corresponding to the client device 410 (block 455). For example, the connection request could specify the client device's 410 MAC address. The client roaming management component 230 of the connection access point 420 could process the MAC address using a hash function to determine a hash value.

The client roaming management component 230 on the connection access point 420 can then identify an access point(s) corresponding to the hash (block 460). For example, the client roaming management component 230 could use the consistent hashing algorithm to identify the access point designated to store network state data for the client device corresponding to the MAC address (e.g., a storage access point 430). Additionally, the client roaming management component 230 could determine one or more additional access points that are designated as redundant storage locations for the access point identified by the hash value (e.g., additional storage access points 440). For example, the client roaming management component 230 could determine two access points that are equidistant from the identified access point within the abstract circle generated by the consistent hashing algorithm.

The client roaming management component 230 can then determine network addresses for the identified access points (block 465). For example, the client roaming management component 230 could access a route table 240 on the connection access point 420 to determine IP addresses corresponding to the identified access point (e.g., the storage access point 430), as well as the two access points designated as redundant storage locations for the identified access point (e.g., the additional storage access points 440). Alternatively, the client roaming management component 230 could be provided the IP addresses by a management entity. As another alternative, the client roaming management component 230 can identify the IP addresses using local discovery techniques. In the depicted embodiment, the client roaming management component 230 transmits a lookup request specifying the client identifier for the client device 410 to the determined network addresses (block 470). Thus, as shown, the client roaming management component 230 transmits two lookup requests, one to the storage access point 430 and another to an additional storage access point 440.

In the depicted embodiment, the client roaming management component 230 on the storage access point 430 performs a lookup operation to identify whether network state information for the client device 410 is stored on the storage access point 430 (block 475). As shown, the client roaming management component 230 determines that network state information for the client device 410 is stored on the storage access point 430 and transmits the network state information for the client device to the connection access point 420 (block 480). Such network state information could be stored on the storage access point 430 when, for example, the client device 410 has already been authenticated by another access point on the network (e.g., an access point to which the client 410 was connected before roaming) and has a valid PMK assigned. If the client roaming management component 230 on the storage access point 430 determines that no network state data is available for the MAC address corresponding to the client device 410, the client roaming management component 230 can transmit a message indicating that no network state data is available to the connection access point 420 (rather than the message sent at block 480). In the depicted embodiment, however, the client roaming management component 230 on the connection access point 420 authenticates the client device 410 using the received network state information (block 485), and the method 400 ends.

Further, in an embodiment, the connection access point 420 can transmit a context request to the access point to which the client device 410 had previously connected (e.g., before roaming to the connection access point 420). The context request can retrieve network policies which are dynamically changing and which could be inefficient to store in the storage access point 430. The previous access point to which the client device 410 had connected can respond to the connection access point 420 with a context response.

Figure 5:
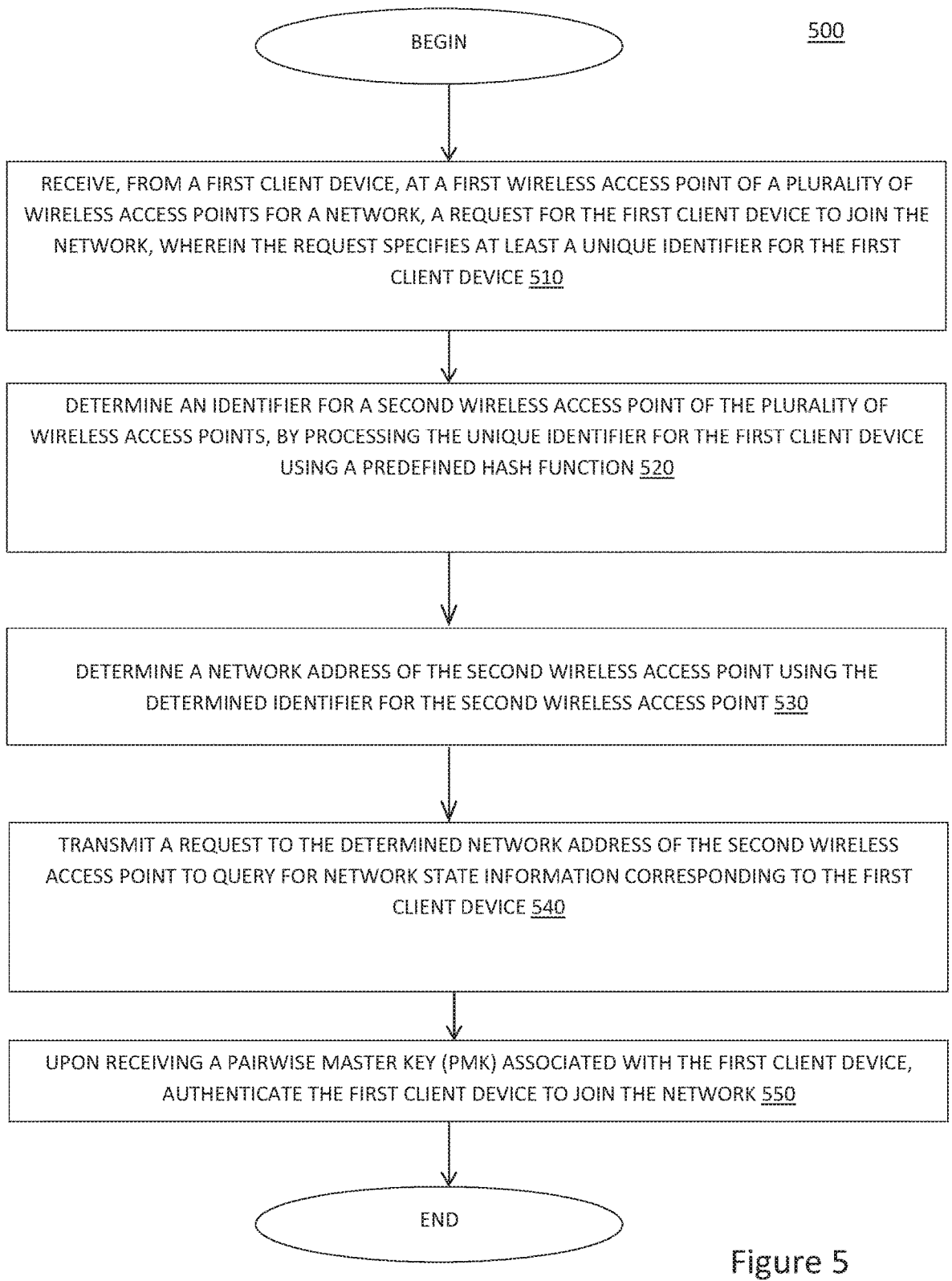
FIG. 5 is a flow diagram illustrating a method for efficiently authenticating a client, according to one embodiment described herein.

FIG. 5 is a flow diagram illustrating a method for efficiently authenticating a client, according to one embodiment described herein. As shown, the method 500 begins at block 510, where the client roaming management component 230 receives, from a first client device, at a first wireless access point of a plurality of wireless access points for a network, a request for the first client device to join the network, wherein the request specifies at least a unique identifier for the first client device. The client roaming management component 230 determines an identifier for a second wireless access point of the plurality of wireless access points, by processing the unique identifier for the first client device using a predefined hash function (block 520).

Additionally, the client roaming management component 230 determines a network address of the second wireless access point using the determined identifier for the second wireless access point (block 530). The client roaming management component 230 transmits a request to the determined network address of the second wireless access point to query for network state information corresponding to the first client device (block 540). Upon receiving a pairwise master key (PMK) associated with the first client device, the client roaming management component 230 authenticates the first client device to join the network (block 550), and the method 500 ends.

Figure 6:
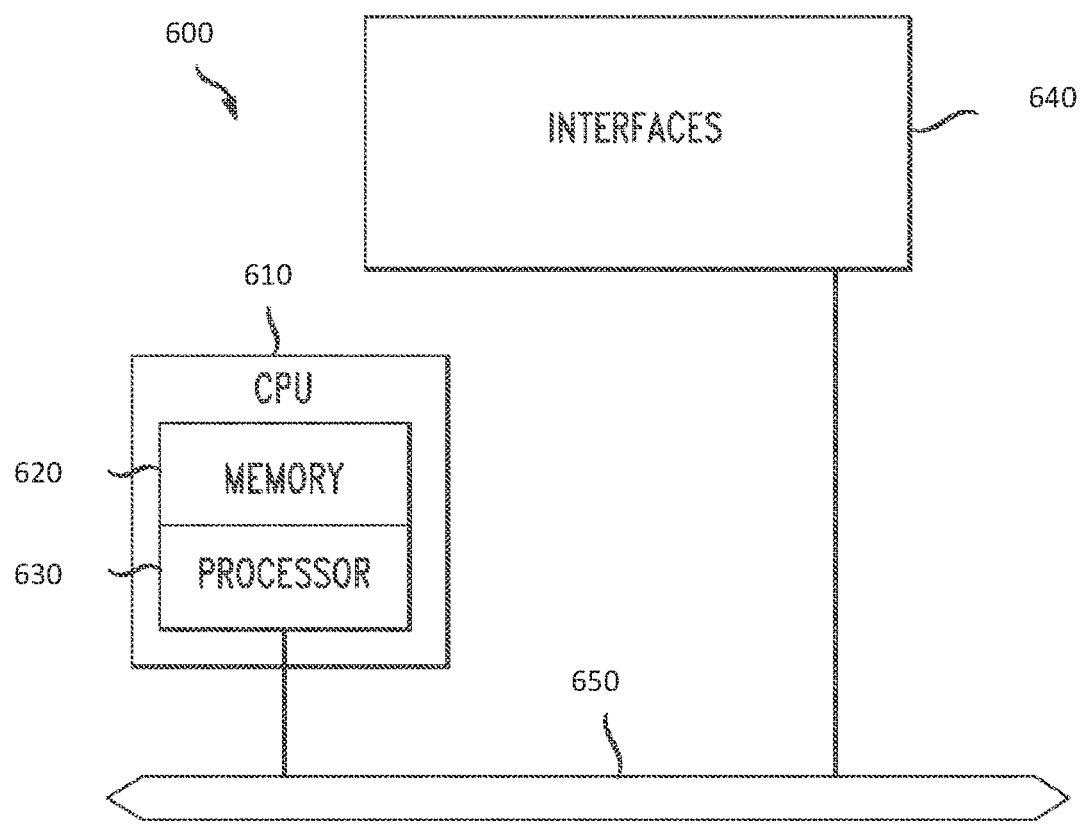
FIG. 6 is a block diagram illustrating an example network device, according to one embodiment described herein.

FIG. 6 is a block diagram illustrating an example network device, according to one embodiment described herein. Network device 600 includes a master central processing unit (CPU) 610, interfaces 640, and a bus 650 (e.g., a PCI bus). When acting under the control of appropriate software or firmware, the CPU 610 is responsible for executing packet management, error detection, and/or routing or forwarding functions. The CPU 610 can accomplish all these functions under the control of software including an operating system and any appropriate applications software. CPU 610 may include one or more processors 863 such as a processor from the Motorola family of microprocessors or the MIPS family of microprocessors. In an alternative embodiment, processor 630 is specially designed hardware for controlling the operations of network device 600. In a specific embodiment, a memory 620 (such as non-volatile RAM and/or ROM) also forms part of CPU 610. However, there are many different ways in which memory could be coupled to the system.

The interfaces 640 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 630 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 620) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734 and 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735 (e.g., a display device), and so forth, to carry out the function.

Figure 7B:
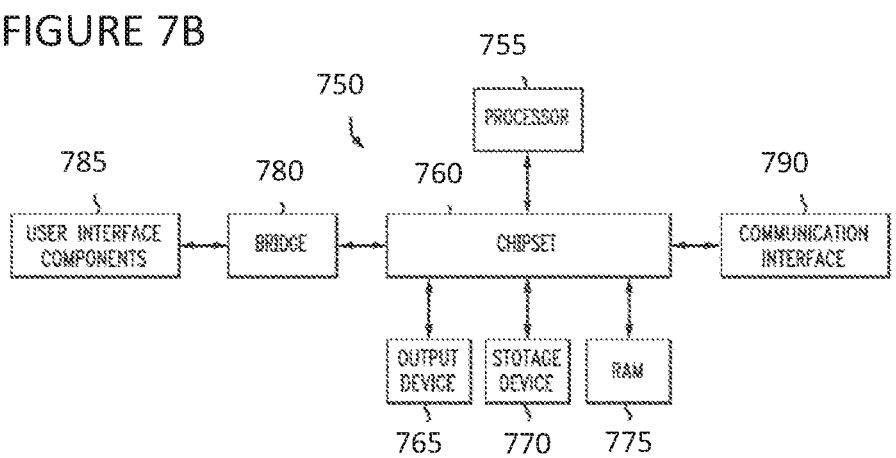

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 980 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755. It can be appreciated that example systems 700 and 750 can have more than one processor 710 or be part of a group or cluster of computing devices networked together to provide greater processing capability.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can include one or more cloud controllers which can help manage and interconnect various elements in the cloud as well as tenants or clients connected to the cloud.

Cloud controllers and/or other cloud devices can be configured for cloud management. These devices can be pre-configured (i.e., come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
receiving, from a first client device, at a first wireless access point of a plurality of wireless access points for a network, a request for the first client device to join the network, wherein the request specifies at least an identifier for the first client device;
determining an identifier for a second wireless access point of the plurality of wireless access points, by processing the identifier for the first client device using a predefined hash function, wherein the second wireless access point is one of at least two wireless access points configured to each redundantly store network state information relating to the first client device;
determining a network address of the second wireless access point using the determined identifier for the second wireless access point;
transmitting a first request to the determined network address of the second wireless access point, for network state information corresponding to the first client device, the network state information comprising a pairwise master key (PMK) associated with the first client device and profile information associated with the first client device;
identifying a third wireless access point, of the at least two wireless access points configured to each redundantly store network state information relating to the first client device, using the hash function, comprising:
determining a position of the third wireless access point on an abstract circle comprising identifiers for each of the at least two wireless access points configured to each redundantly store network state information relating to the first client device;
transmitting a second request, for network state information corresponding to the first client device, to the third wireless access point;
receiving a response to the second request, comprising the PMK associated with the first client device and the profile information associated with the first client device; and
authenticating the first client device and establishing a connection between the first client device and the network, using the PMK and the profile information received in the response to the second request.

2. The method of claim 1, further comprising:
upon receiving the PMK associated with the first client device, transmitting, by the first wireless access point, updated network state information for the first client device to the second wireless access point using the network address, wherein the updated network state information indicates that the first client device is currently connected to the first wireless access point.

3. The method of claim 1, further comprising:
determining to refresh the PMK associated with the first client device;
generating an updated PMK for the first client device; and
transmitting updated network state information for the first client device, including at least the updated PMK, to the determined network address of the second wireless access point.

4. The method of claim 1, wherein determining a network address of the second wireless access point using the determined identifier for the second wireless access point further comprises:
  performing a lookup operation in a route table stored on the first wireless access point using the determined identifier for the second wireless access point.

5. The method of claim 1, wherein the network address of the second wireless access point is identified using local discovery.

6. A wireless access point, comprising:
  one or more computer processors; and
  non-transitory logic that when executed by operation of the one or more computer processors performs an operation comprising:
    receiving, from a first client device, at a first wireless access point of a plurality of wireless access points for a network, a request for the first client device to join the network, wherein the request specifies at least an identifier for the first client device;
    determining an identifier for a second wireless access point of the plurality of wireless access points, by processing the identifier for the first client device using a predefined hash function, wherein the second wireless access point is one of at least two wireless access points configured to each redundantly store network state information relating to the first client device;
    determining a network address of the second wireless access point using the determined identifier for the second wireless access point;
    transmitting a first request to the determined network address of the second wireless access point, for network state information corresponding to the first client device, the network state information comprising a pairwise master key (PMK) associated with the first client device and profile information associated with the first client device;
    identifying a third wireless access point, of the at least two wireless access points configured to each redundantly store network state information relating to the first client device, using the hash function, comprising:
      determining a position of the third wireless access point on an abstract circle comprising identifiers for each of the at least two wireless access points configured to each redundantly store network state information relating to the first client device;
    transmitting a second request, for network state information corresponding to the first client device, to the third wireless access point;
    receiving a response to the second request, comprising the PMK associated with the first client device and the profile information associated with the first client device; and
    authenticating the first client device and establishing a connection between the first client device and the network, using the PMK and the profile information received in the response to the second request.

7. The wireless access point of claim 6, the operation further comprising:
  upon receiving the PMK associated with the first client device, transmitting, by the first wireless access point, updated network state information for the first client device to the second wireless access point using the network address, wherein the updated network state information indicates that the first client device is currently connected to the first wireless access point.

8. The wireless access point of claim 6, the operation further comprising:
  determining to refresh the PMK associated with the first client device;
  generating an updated PMK for the first client device; and
  transmitting updated network state information for the first client device, including at least the updated PMK, to the determined network address of the second wireless access point.

9. A system, comprising:
  a plurality of wireless access points configured to form a network, wherein a first wireless access point of the plurality of wireless access points is configured to perform an operation, comprising:
    receiving, from a first client device, a request for the first client device to join the network, wherein the request specifies at least an identifier for the first client device;
    determining an identifier for a second wireless access point of the plurality of wireless access points, by processing the identifier for the first client device using a predefined hash function, wherein the second wireless access point is one of at least two wireless access points configured to each redundantly store network state information relating to the first client device;
    determining a network address of the second wireless access point using the determined identifier for the second wireless access point;
    transmitting a first request to the determined network address of the second wireless access point, for network state information corresponding to the first client device, the network state information comprising a pairwise master key (PMK) associated with the first client device and profile information associated with the first client device;
    identifying a third wireless access point, of the at least two wireless access points configured to each redundantly store network state information relating to the first client device, using the hash function, comprising:
      determining a position of the third wireless access point on an abstract circle comprising identifiers for each of the at least two wireless access points configured to each redundantly store network state information relating to the first client device;
    transmitting a second request, for network state information corresponding to the first client device, to the third wireless access point;
    receiving a response to the second request, comprising the PMK associated with the first client device and the profile information associated with the first client device; and
    authenticating the first client device and establishing a connection between the first client device and the network, using the PMK and the profile information received in the response to the second request.

10. The system of claim 9, the operation further comprising:
  upon receiving the PMK associated with the first client device, transmitting, by the first wireless access point, updated network state information for the first client device to the second wireless access point and the one or more additional wireless access points using the network address and the one or more additional network addresses, wherein the updated network state information indicates that the first client device is currently connected to the first wireless access point.

11. The system of claim 9, the operation further comprising:
- determining to refresh the PMK associated with the first client device;
- generating an updated PMK for the first client device; and
- transmitting updated network state information for the first client device, including at least the updated PMK, to the determined network address of the second wireless access point, wherein the identifier further comprises a Media Access Control (MAC) address of the first client device.

* * * * *

UNITED STATES PATENT AND TRADEMARK OFFICE
CERTIFICATE OF CORRECTION

PATENT NO. : 11,218,918 B2  
APPLICATION NO. : 16/939749  
DATED : January 4, 2022  
INVENTOR(S) : Prashant Kumar et al.

Page 1 of 1

It is certified that error appears in the above-identified patent and that said Letters Patent is hereby corrected as shown below:

In the Specification

In Column 14, Line 63, delete "980" and insert -- 780 --.

Signed and Sealed this  
Third Day of May, 2022

Katherine Kelly Vidal  
*Director of the United States Patent and Trademark Office*